Figure 1:
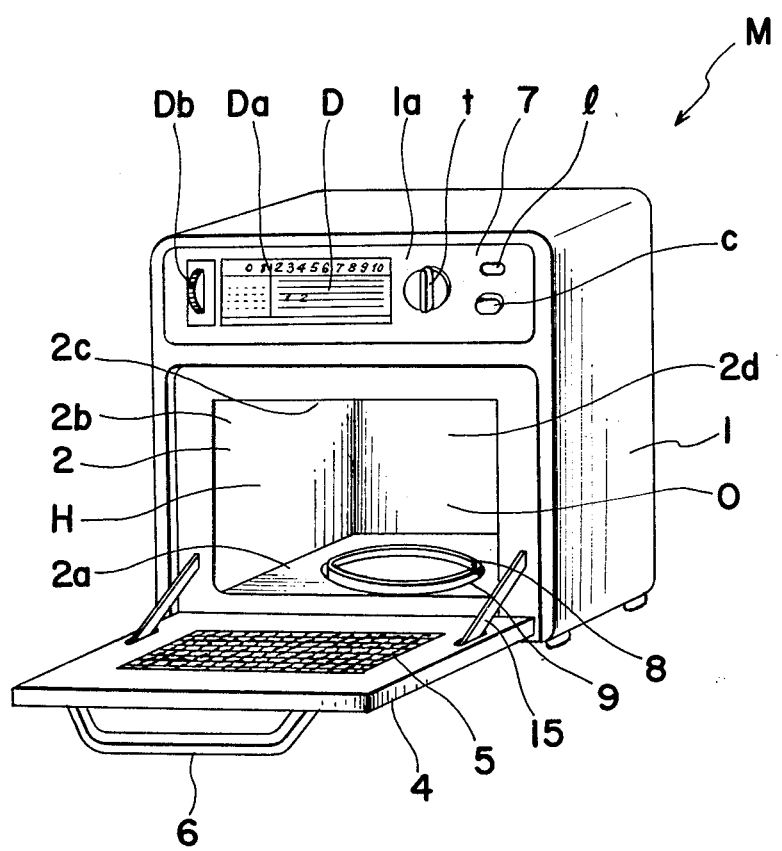

United States Patent [19]

Tanaka et al.

[11] 4,131,778

[45] Dec. 26, 1978

[54] MICROWAVE OVEN

[75] Inventors: Junzo Tanaka, Fujiidera; Toshio Kai, Yamatokoriyama, both of Japan

[73] Assignee: Matsushita Electric Industrial Co., Ltd., Kadoma, Japan

[21] Appl. No.: 773,118

[22] Filed: Feb. 28, 1977

[30] Foreign Application Priority Data

| Mar. 4, 1976 [JP] | Japan | 51-24472 |
| Apr. 15, 1976 [JP] | Japan | 51-43109 |
| Mar. 22, 1976 [JP] | Japan | 51-34801[U] |
| Sep. 1, 1976 [JP] | Japan | 51-105323 |

[51] Int. Cl.² .............................................. H05B 9/06
[52] U.S. Cl. ............................................. 219/10.55 F
[58] Field of Search ............... 219/10.55 A, 10.55 E, 219/10.55 F; 126/41 A, 75, 338; 198/803; 312/135; 108/94; 310/103; 259/DIG. 46

[56] References Cited

U.S. PATENT DOCUMENTS

| 1,941,906 | 1/1934 | Marinsky | 126/338 |
| 2,520,602 | 8/1950 | Linder | 324/95 |
| 2,929,477 | 3/1960 | Rodriguez et al. | 310/103 |
| 2,961,520 | 11/1960 | Long | 219/10.55 F |
| 3,113,228 | 12/1963 | Tolegian | 259/DIG. 46 |
| 3,321,605 | 5/1967 | Reker | 219/10.55 F |

FOREIGN PATENT DOCUMENTS 47-39248  6/1972 Japan ................. 219/10.55 F

OTHER PUBLICATIONS

Indiana General, Magnetic Drives, Mar. 1970, E.D.G. 382.
Indiana General Ceramic Radial Gap Drives, Jun. 1970, E.D.G. 399.

*Primary Examiner*—J. V. Truhe
*Assistant Examiner*—Bernard Roskoski
*Attorney, Agent, or Firm*—Wenderoth, Lind & Ponack

[57] ABSTRACT

A microwave oven including a rotary table or turn table disposed on the bottom surface of a heating cavity and a rotary member associated with a driving motor through a driving mechanism and disposed adjacent to the rotary table and the bottom wall of the heating cavity for rotating the rotary table through magnetic coupling means. Should the rotary table be prevented from being rotated or locked for some reason, the magnetic coupling is released, so that damage to the driving motor and the like are advantageously prevented.

9 Claims, 15 Drawing Figures

MICROWAVE OVEN

The present invention relates to a high frequency heating apparatus and more particularly, to a microwave oven or an electronic oven equipped with a rotary table for placing an object to be heated or food material to be cooked thereon.

Conventionally, in a microwave oven which is provided with a rotary table or turn table rotatably disposed in a heating cavity or heating chamber for moving food material placed thereon during cooking so as to eliminate uneven heating, the rotational force of a motor employed as driving source is mechanically transmitted via reduction gears to a rotary shaft extending into the heating cavity through the bottom plate thereof and rotatably journalled therein and fitted, for example, into an opening formed in the rotary table for engagement therewith, while a plurality of rollers are rotatably disposed between the lower surface of the rotary table and the bottom plate of the heating cavity for making possible smooth rotation of the rotary table.

The conventional microwave ovens of the above described type, however, have various disadvantages in that;

(i) Since the rotary shaft extends into the heating cavity through the bottom plate thereof, excessive heat generation, microwave leakage and the like tend to take place during operation of the microwave oven at the portion of the rotary shaft projecting into the heating cavity, and for the prevention of such inconveniences, it is necessary to make the construction of the microwave oven undesirably complicated, with consequent high cost.

(ii) the projection of the rotary shaft into the heating cavity and the provision of the rollers undetachably mounted within the heating cavity for smooth rotation of the rotary table make it difficult to clean the interior of the heating cavity in an efficient manner.

(iii) If there happens to be, in the path of advance of the rollers, foreign matters such as crumbs or chips of food material which are too large for the rollers to go over, the rotary table will be prevented from rotating and be locked, thus resulting in burning out of the driving motor or uneven heating of the food material to be cooked.

(iv) Oil, juice and the like produced by the food material cooked in the heating cavity, or water used for cleaning the interior of the heating cavity tend to leak out of the heating cavity through the clearance between the rotary shaft and the bottom plate of the heating cavity and to be led toward the motor or reduction gears, thus not only giving rise to various troubles, but emitting undesirable odors in the course of time.

(v) Since the mechanisms for driving the rotary table are complicated, the space between the bottom plate of the heating cavity and the corresponding bottom wall of an oven defining structure tend to be large for accommodating such mechanisms, thus resulting in somewhat unbalanced dimensions of the microwave oven as a whole.

(vi) Vessels to be mounted on the rotary table with food material to be cooked accommodated therein tend to slip on the surface of the rotary table especially due to the impact which occurs upon starting of the rotary table, resulting in spilling or scattering of some of the food material onto the rotary table or slipping of the vessels off the rotary table in some cases.

Accordingly, an essential object of the present invention is to provide a microwave oven having a rotary table which has superior safety characteristics and which will not damage the driving mechanism, even if the rotary table should be locked i.e., be prevented from rotating for some reason, with substantial elimination of disadvantages inherent in the conventional microwave ovens.

Another important object of the present invention is to provide a microwave oven of the above described type in which the rotary table is adapted to rotate with optimum smoothness, with amy foreign matters which are present in the rotational path of the rotary table being removed by removing means provided in connection with the rotary table.

A further object of the present invention is to provide a microwave oven of the above described type which has an efficient driving mechanisms for the rotary table, with a simplified construction, while the space between the bottom plate of the heating cavity and the corresponding wall of the oven defining structure is reduced to provide a microwave oven having well-balanced dimensions.

A still further object of the present invention is to provide a microwave oven of the above described type in which vessels for food material are stably held on the rotary table especially when the rotary table is to be started.

In accomplishing these objects, according to one preferred embodiment of the present invention, the microwave oven is provided with a rotary blade rotatably disposed on the bottom surface of a heating cavity and a rotary member associated with a motor through a belt, another rotary member, a shaft and worm gears and disposed adjacent to the bottom plate and the rotary table of the heating cavity for rotating the rotary table by magnetic coupling means. Should the rotary table be prevented from rotating or locked for some reason, the magnetic coupling between the rotary table and the rotary member is broken so that a temperature rise and damage to the driving motor are advantageously prevented, whereby there is provided a microwave oven the rotary table of which is operable, with increased safety and the disadvantages inherent in conventional microwave ovens are substantially eliminated.

Figure 2:
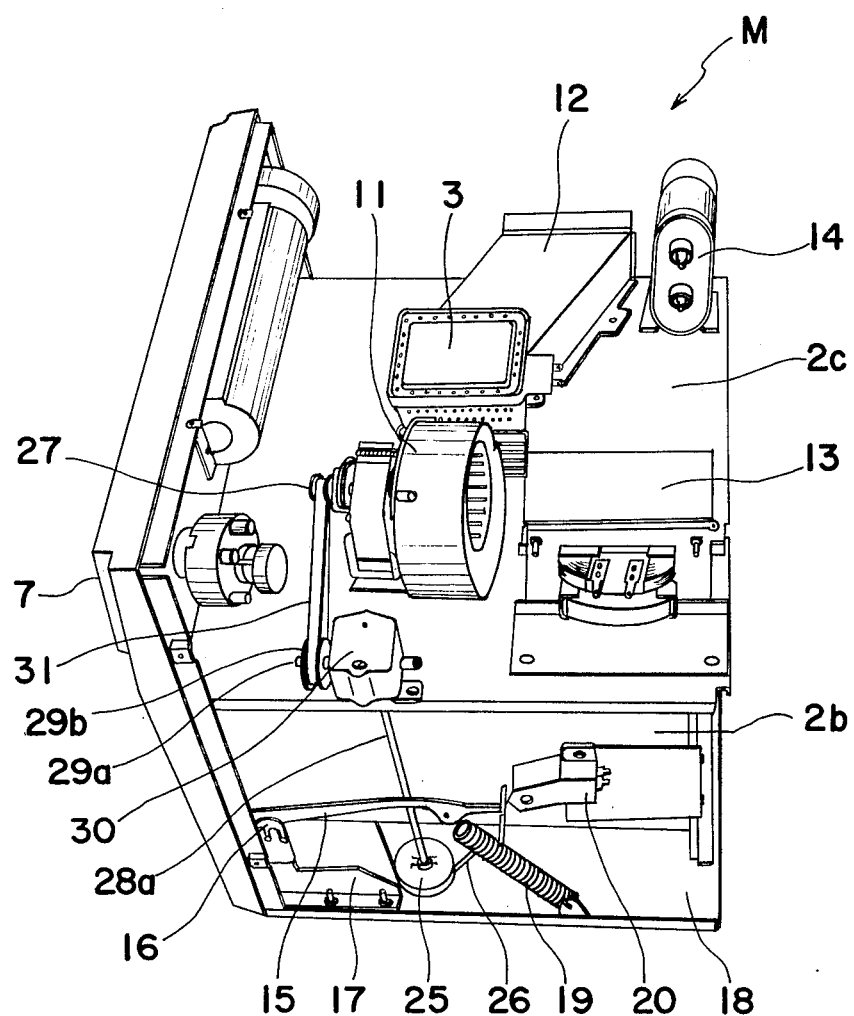
Figure 3:
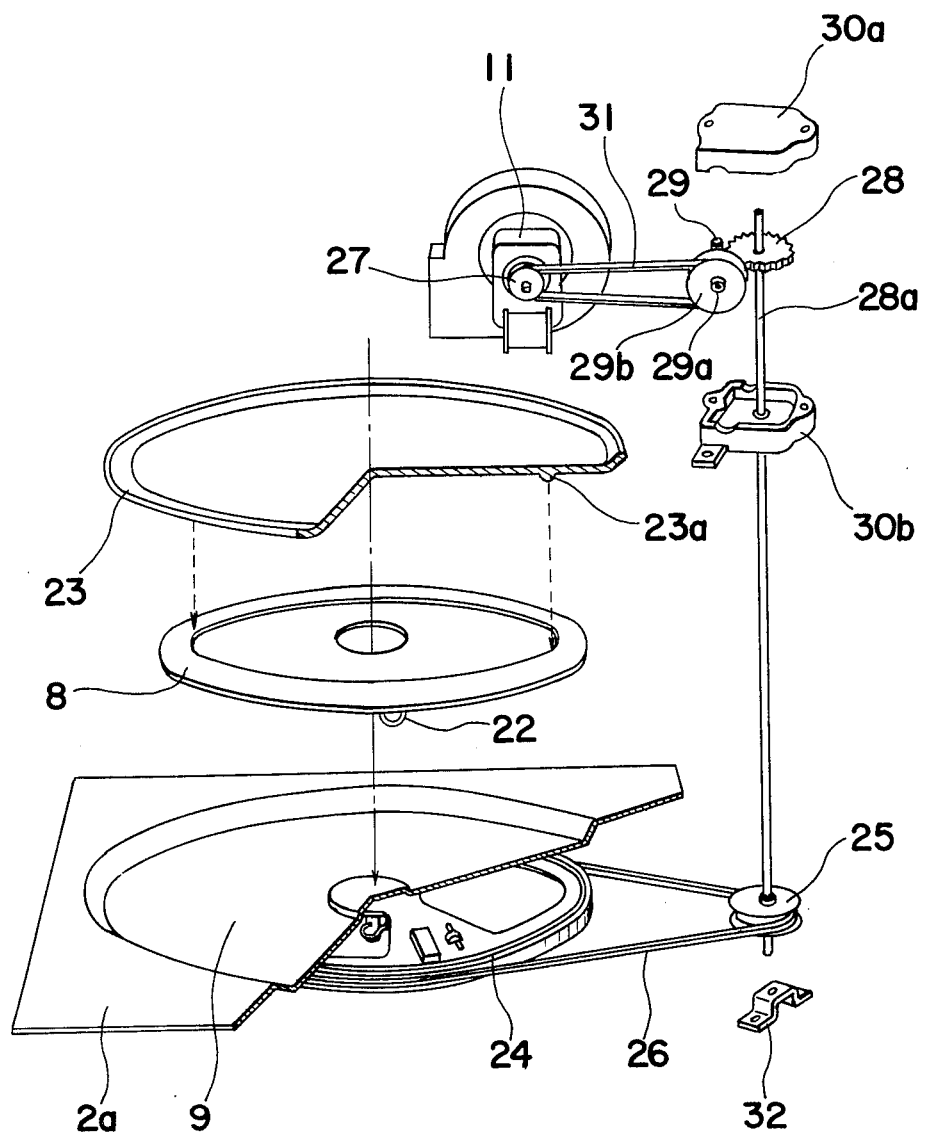
Figure 4:
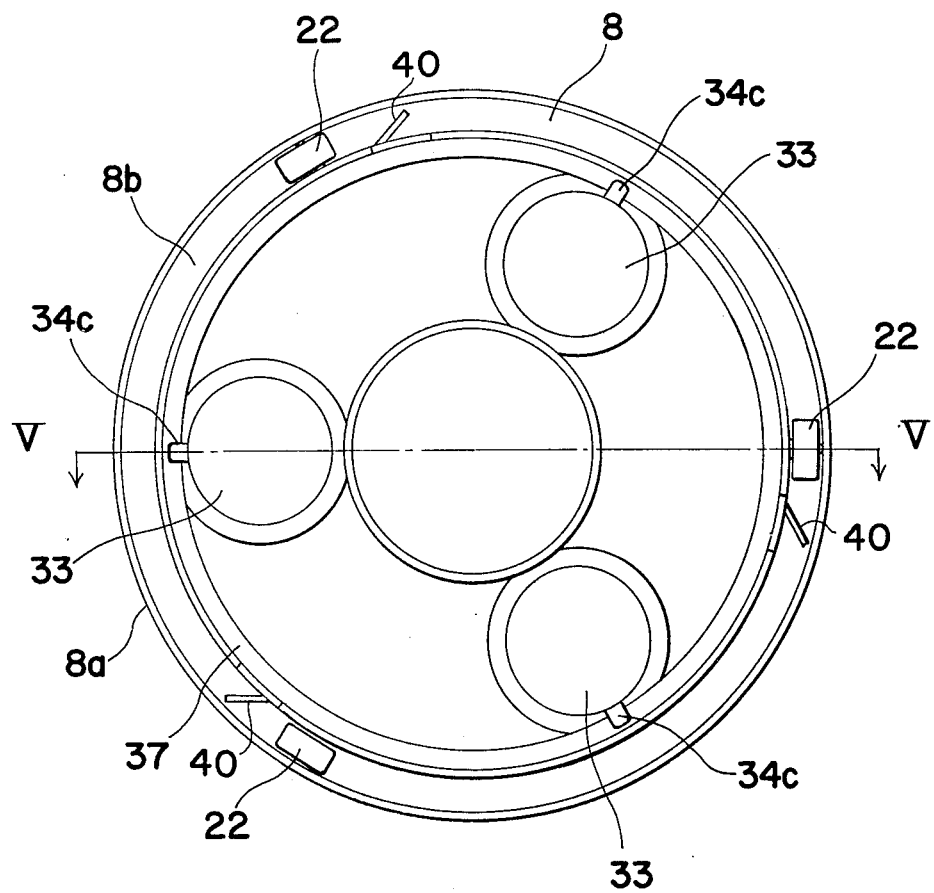
Figure 5:
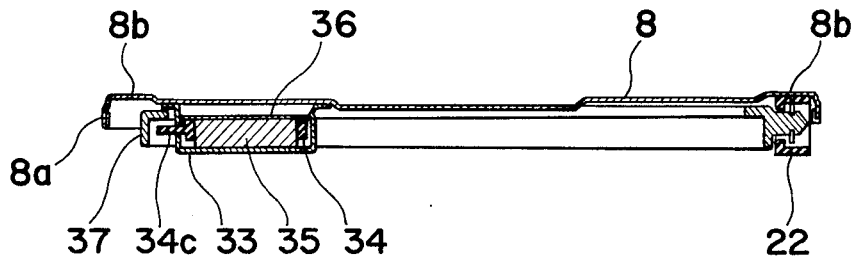
Figure 6:
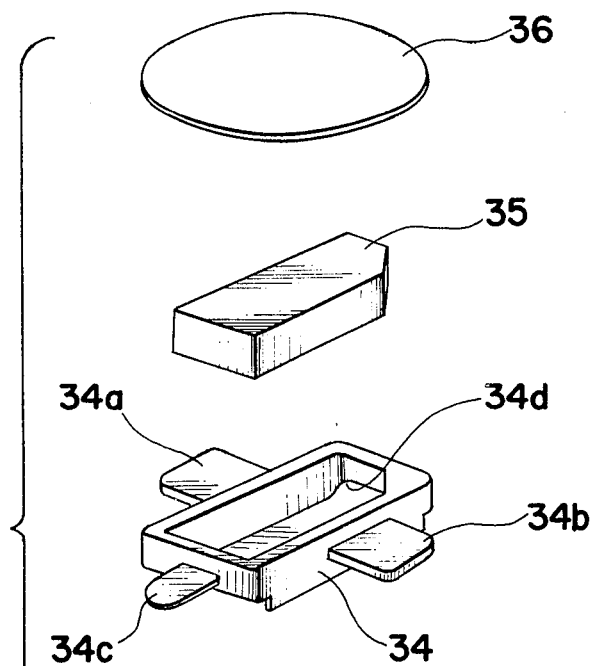
Figure 7:
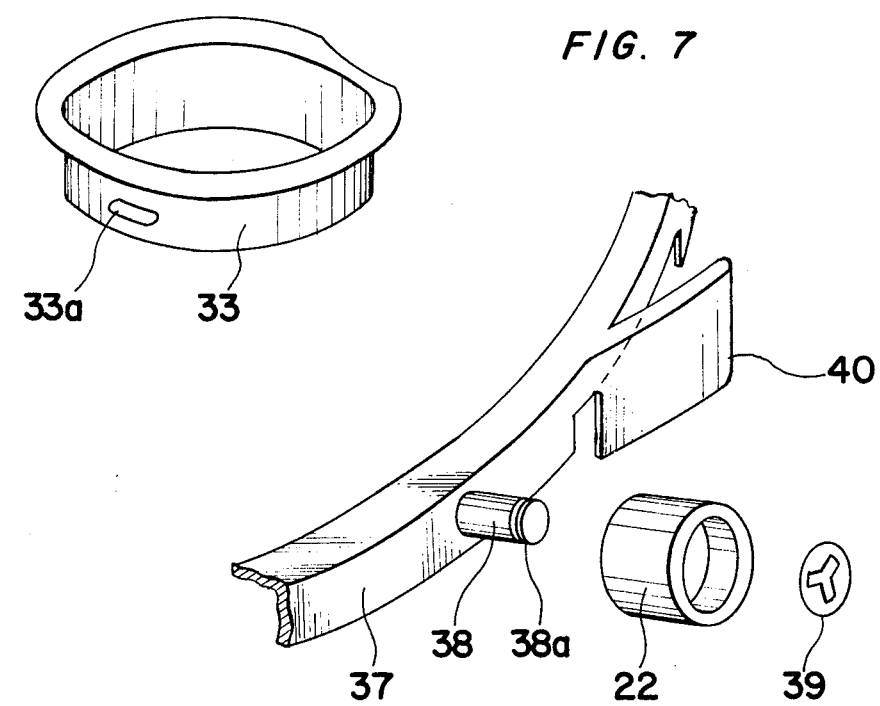
Figure 8:
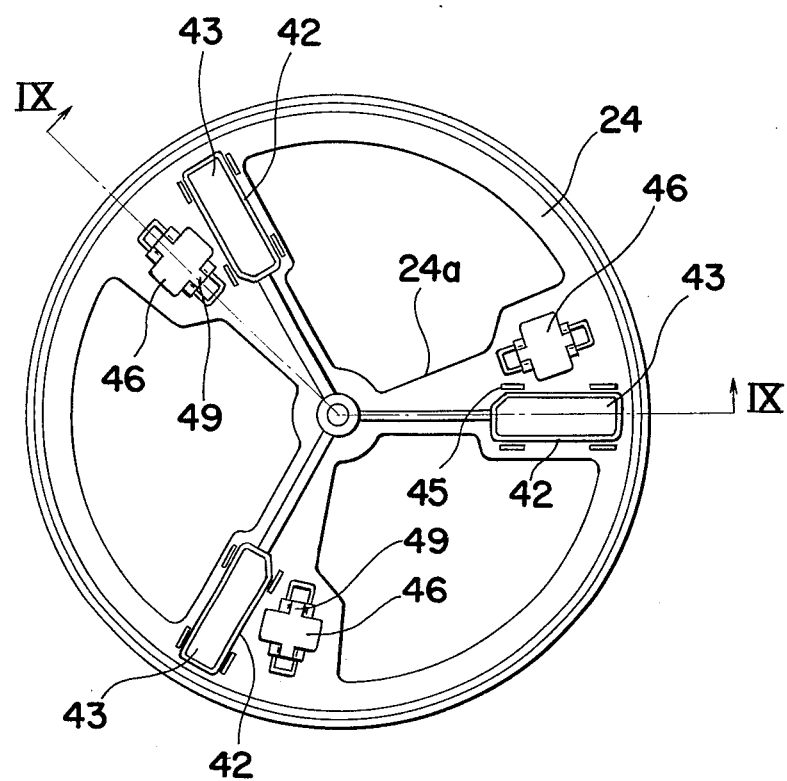
Figure 9:
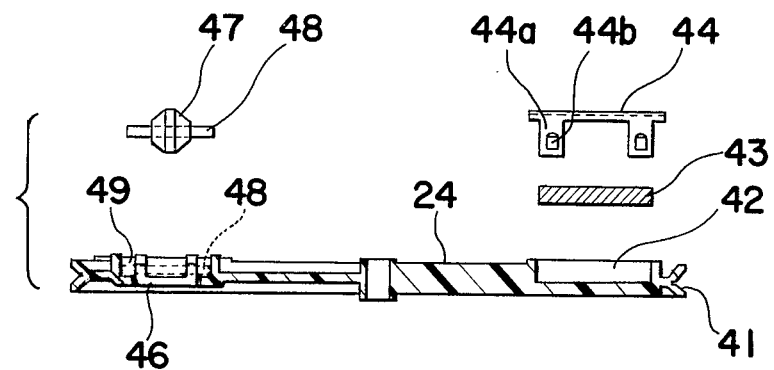
Figure 10:
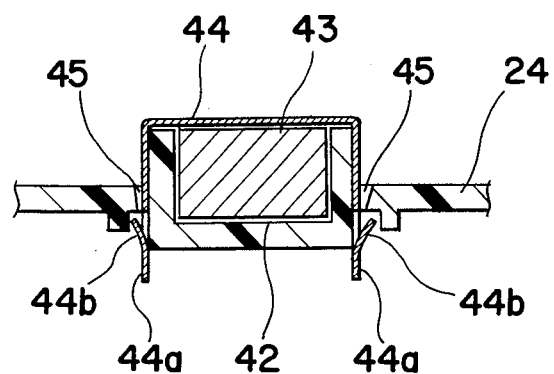
Figure 11:
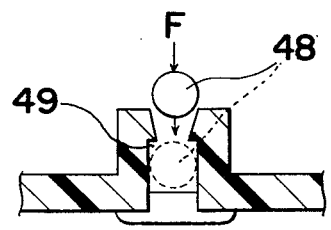
Figure 12:
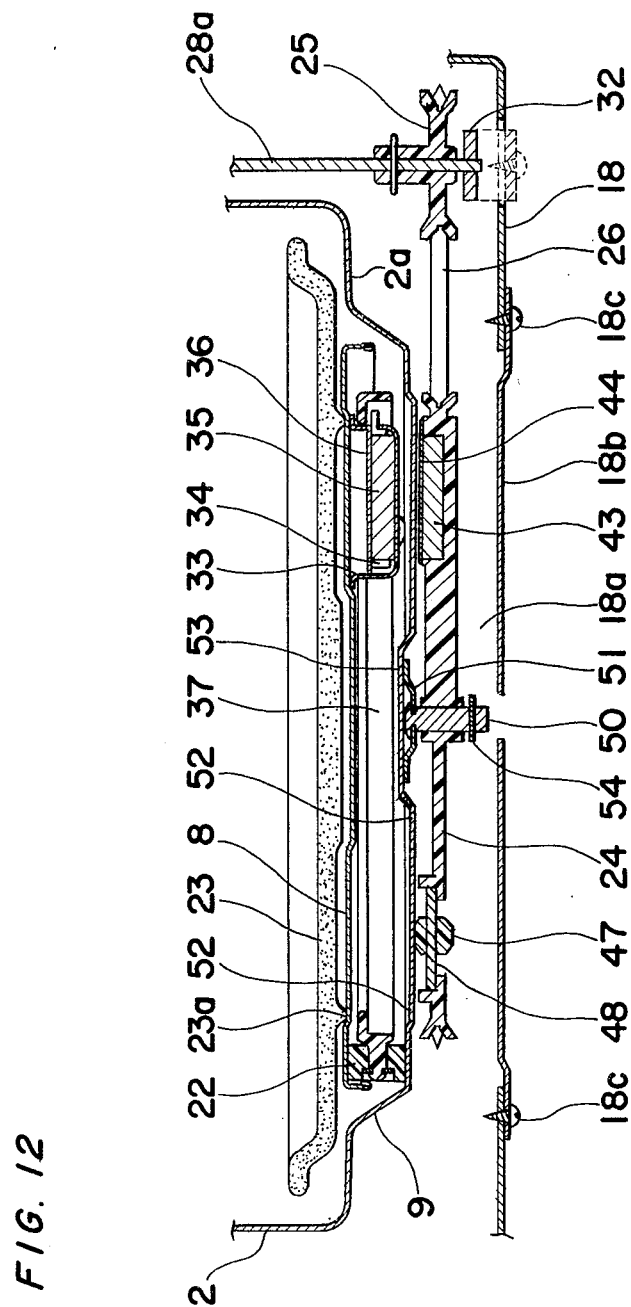
Figure 13:
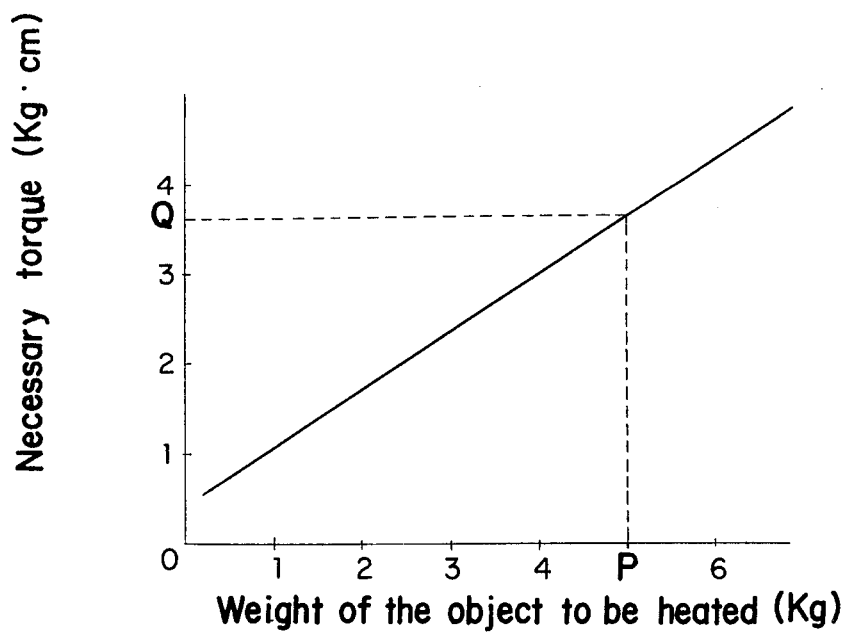
Figure 14:
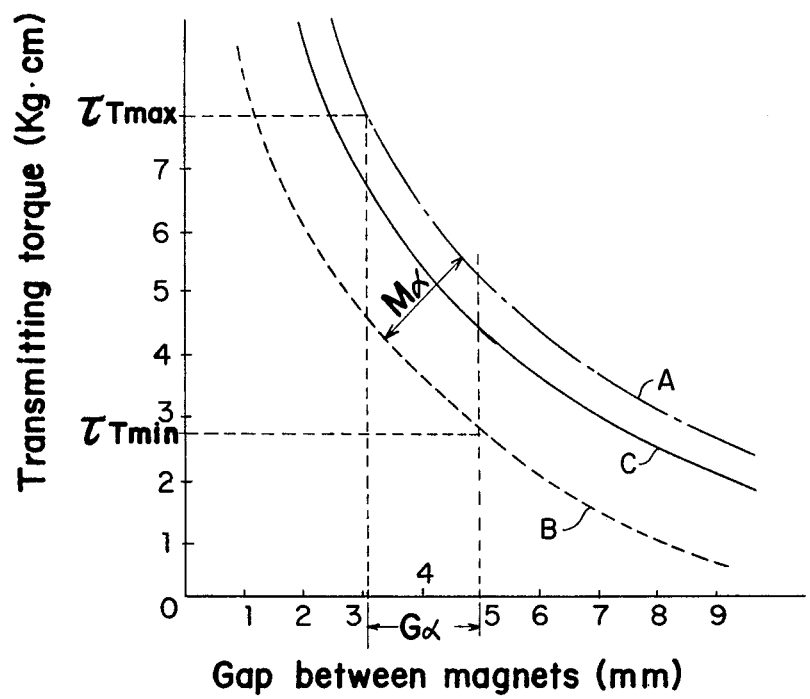
Figure 15:
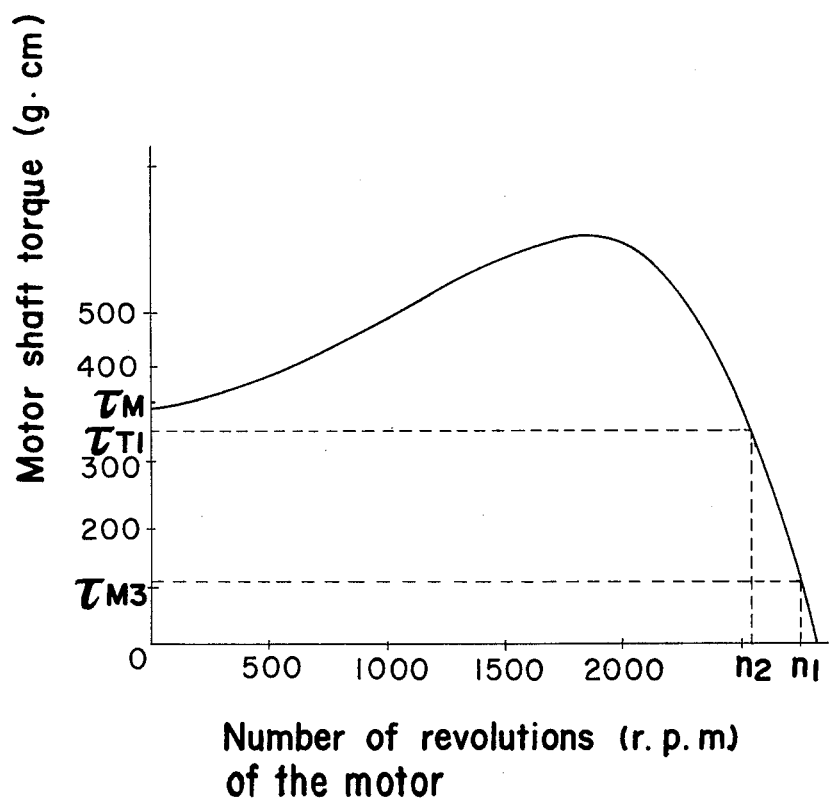

These and other objects and features of the present invention will become apparent from the following description taken in conjunction with the preferred embodiment thereof with reference to the accompanying drawings, in which;

FIG. 1 is a perspective view of a microwave oven to which the present invention is applicable, with the door thereof in an opened state, FIG. 2 is a similar view to FIG. 1, with the outer casing and the door thereof removed for clarity, FIG. 3 is an exploded view showing, on an enlarged scale, an arrangement of a rotary table associated with driving mechanisms therefor employed in the microwave oven of FIG. 1, FIG. 4 is a top plan view of the bottom surface of the rotary table employed in the microwave oven of FIG. 1, FIG. 5 is a cross sectional view taken along the line V—V of FIG. 4, FIG. 6 is an exploded view showing, on an enlarged scale, a magnet assembly incorporated in the rotary table of FIG. 4, FIG. 7 is fragmentary perspective view showing, on an enlarged scale, part of a supporting frame of the rotary table of FIG. 4, FIG. 8 is a top plan view of a first rotary member for driving the rotary table of FIG. 4, FIG. 9 is a cross sectional view taken along the line IX—IX of FIG. 8 with a roller, magnet and magnet cover separately shown for clarity, FIG. 10 is a cross sectional view showing, on an enlarged scale, an arrangement of the magnet and magnet cover employed in the rotary member of FIG. 8, FIG. 11 is a cross sectional view showing, on an enlarged scale, an arrangement for receiving the roller employed in the rotary member of FIG. 8, FIG. 12 is a cross sectional view showing, on an enlarged scale, the arrangement of the rotary table, the first rotary member and driving mechanisms associated therewith at the bottom portion of the microwave oven of FIG. 1, FIG. 13 is a graph showing the relation between the weight of an object to be heated and the torque required for rotating the rotary table, FIG. 14 is a graph showing the relation of the gaps between the magnets to the transmitting torque, and FIG. 15 is a graph showing the relation between the number of revolutions of the motor and the motor shaft torque.

Before the description of the present invention proceeds, it is to be noted that like parts are designated by like reference numerals throughout the several views of the accompanying drawings.

Referring now to the drawings, there is shown in FIGS. 1 and 2 a microwave oven M to which the present invention is applicable. The microwave oven M heat-treats objects or food material based on the principle of dielectric heating by utilizing high frequency energy, for example, on the order of about 2,450 MHz, and generally includes an outer casing 1 of cubical box-like shape open at the front side thereof. The outer casing 1 has a double wall structure with inner walls 2 which are suitably made of electrically conductive weakly magnetizable material and define a heating cavity or heating chamber H. The inner walls 2 include a horizontal bottom plate or base plate 2a, vertical side walls 2b, a top wall 2c and a rear wall 2d, and define an access opening O at the front of the oven M. In the heating cavity H immediately above the horizontal base plate 2a, there is rotatably disposed a rotary blade 8 in a manner as described later, on which table 8, a vessel or dish (not shown) for accommodating an object or food material (not shown) to be heated therein is detachably mounted. The outer surfaces of the walls 2a, 2b, 2c and 2d are spaced from the corresponding walls of the outer casing 1 for providing spaces therebetween. The outer casing 1 further includes an outside front wall portion 1a immediately above the opening O. On the front wall portion 1a, there is mounted a control panel 7 for controlling the functioning of a high frequency oscillator and the like described later, which panel carries thereon a rotatable drum D having the heating time required for a plurality of menus imprinted on its peripheral surface, a pointer needle Da for the drum D, a drum rotating ring Db, a timer operating knob t, a function indication lamp l and a cooking start button C for initiating the high frequency heating. For setting the heating time for optimum cooking, the drum D is rotated by the ring Db to find the heating time required for a particular food material to be cooked with which the pointer needle Da is aligned by the timer operating knob t.

Further included in the microwave oven M is a door 4 provided with a handle 6 adjacent to one edge thereof remote from a hinge by which the door 4 is supported, at the lower edge thereof, on the lower front edge of the casing 1 in a position corresponding to the access opening O for pivotal upward and downward movements about the hinge so as to selectively open and close the opening O. The door 4 has a rectangular observation window 5 formed therein to allow the object placed in the heating cavity H to be observed therethrough and also for preventing the high frequency energy from leaking out of the heating cavity H during operation of the microwave oven M.

In the spaces defined by the side walls 2b of the inner walls 2 and the corresponding walls of the outer casing 1, there are slidably accommodated a pair of door arms 15 for the door 4, rollers 16 for causing the door arms 15 to slide forward and backward, support plates 17 rotatably supporting the rollers 16 and suitably secured to frames of the oven M, springs 19 connected between the door arms 15 and the bottom wall 18 of the outer casing 1, and a door switch 20 so disposed as to be selectively opened and closed during the forward and backward movements of the door arms 15.

Meanwhile, on the top wall 2c of the heating cavity H in the space defined by said top wall 2c and the corresponding top wall of the outer casing 1, there are mounted the high frequency oscillator or magnetron assembly 3 for radiating the high frequency energy into the heating cavity H, a fan motor 11 for cooling the magnetron assembly 3, an air guide 12 for leading the air which has flowed over the magnetron assembly 3 into the heating cavity H, a high voltage transformer 13 for supplying high voltage to the magnetron assembly 3, a high voltage capacitor 14, and a gear box 30 for transmitting the rotation of the fan motor 11 to the rotary table 8 in a manner described in detail later.

Referring also to FIG. 3, the bottom plate 2a of the heating cavity H made of non-magnetizable metallic plate has formed therein, approximately at the central portion thereof, with a drawn portion or circular recess 9, and the rotary table 8 is rotatably supported on the bottom surface of the recess 9 on a plurality of rotatable rollers 22 of synthetic resin material, while a vessel 23 of glass material is detachably mounted on the rotary table 8 for accommodating therein the object (not shown) to be heated.

On the other hand, below the under surface of the circular recess 9, there is rotatably disposed a first rotary member 24 in the form of a pulley in a position corresponding to that of the rotary table 8, and upon rotation of the rotary member 24, the rotary table 8 is rotated by magnetic coupling means including permanent magnets in a manner which will be described more in detail later. To one side of the first rotary member 24, there is rotatably disposed a second rotary member 25 also in the form of a pulley, and the members 24 and 25 are connected for simultaneous rotation by a belt 26. On the other hand, in the gear box 30, for example, of synthetic resin mounted on the top wall 2c of the heating cavity H and including an upper casing 30a and a lower casing 30b, a worm wheel 28 and a worm 29 engaging therewith are housed, and a pulley 29b fixed to a worm shaft 29a is connected to a pulley 27 secured to the shaft of the fan motor 11, also mounted on the top wall 2c by a belt 31, while a wheel shaft 28a of the worm wheel 28 is journalled at one end thereof on the upper casing 30a and the other end of the shaft 28a extends through a hole formed in the lower casing 30b. The lower most end of the shaft 28a is rotatably mounted in a bearing 32 secured to the bottom plate 18 of the outer casing 1. The second rotary member 25 is secured to the shaft 28a at a position above the bearing 32 as is most clearly seen in FIg. 3.

Accordingly, upon driving of the fan motor 11, the magnetron assembly 3 is cooled by the air flow caused by the fan motor 11, and simultaneously, the first rotary member 24 is rotated by the belt 31, worm 29, worm wheel 28, worm shaft 28a, second rotary member 25 and belt 26 for rotating the rotary table 8 by the magnetic coupling means described hereinbelow.

Referring to FIGS. 4 to 12, since the rotary table 8 is supported in the circular recess 9 of the bottom plate 2a on the rollers 22 of synthetic resin as described earlier, the table 8 is rotated in a floating manner in the electromagnetic field in the heating cavity H. On the lower surface of the rotary table 8, which is made of non-magnetic material, for example, stainless steel material SUS304, aluminum or the like, three circular magnet cover members 33 made of non-magnetic material are fixed mounted in positions which lie on an imaginary circle concentric with the rotary plate 8, for example, by spot welding as shown in FIGS. 4 and 5. In each of the cover members 33, there is disposed a case 34 of resinous material. In the frame 34d of each case 34 is mounted a permanent magnet 35, with the magnet 35 being covered with a strongly magnetic metallic plate 36. The case 34 is provided with projections 34a, 34b, and 34c extending outwardly therefrom, and the lateral projections 34a and 34b are adapted to contact the inner wall of the case 34, while the forward projection 34c extends through a corresponding opening 33a formed in the cover member 33 when the case is accommodated in the case 34. It is to be noted here that since the projection 34c is thick at its root portion and suitably narrowed toward its forward end, the projection 34c is readily inserted into the opening 33a, and when thus inserted into the opening 33a, its root portion closely contacts the opening 33a for substantially completely preventing crumbs or chips of food material from entering the interior of the cover member 33.

In FIGS. 4 and 5, the projections 34c project under the surface of a circular support frame 37 having an L-shape cross section which limits the positions of the rollers 22, thus preventing the support frame 37 from coming off the lower surface of the rotary table 8 when the latter is lifted out of the recess 9.

Particularly referring to FIG. 7, each of the rollers 22 ia rotatably mounted onto a pin 38 secured to the outer periphery of the circular support frame 37, and a retainer 39 of resinuous material is fitted into an annular groove 38a formed adjacent to the free end of the pin 38 for retaining and positioning of the roller 22 thereon. On the outer periphery of the support frame 37 at positions ahead of the rollers 22 in the direction of rotation of the table 8, i.e., in the path of advance of the rollers 22, there are provided angularly outwardly and forwardly extending projections 40 as shown. Accordingly, upon rotation of the rotary table 8, any crumbs or chips of food material or the like are advantageously led toward inner side of the support frame 37 and removed from the path of the rollers 22, and thus, disadvantages inherent in the conventional microwave oven such as increase of frictional resistance due to adhesion of food chips, juice and the like to the roller portions, reduction of transmission torque or increase of rotational torque arising from increased gaps between the magnets, danger of uneven heating due to locking of the rotary table resulting from clogging of large chips of food material and the like are advantageously eliminated. It is to be noted here that since the projections 40 are mounted on the frame 37 in an inclined manner, these projections 40 do not apply any large force to the frame 37 during removal of food chips while serving as guides for getting rid of such chips.

Referring back to FIG. 5, the outer periphery of the rotary table 8 extends downwardly to a certain extent to form a rim portion 8a and the lower end of the rim portion 8a is folded back inwardly through 180° and closely fitted around the inner surface of the rim portion 8a as shown. Accordingly, the rim portion 8a serves as a guide during rotation of the rollers 22, and since the rim portion 8a is rounded in the above described manner, there is no concentration of the electric field in the heating cavity H or spark discharge thereat, and the temperature increase at the rim portion 8a of the rotary table 8 is negligible, and thus deformation or the like of the rotary table 8 due to such heat is advantageously prevented. The rotary table 8 is further provided with an annular raised portion 8b concentrically formed on its upper surface adjacent to the outer periphery thereof, which raised portion 8b serves as a concave guide groove for the rollers 22 when observed from the lower surface of the table 8, and the bottom support rim 23a (FIG. 3) on the bottom of the vessel 23 contacts the inner periphery or rising part of the raised portion 8b when the vessel 23 is placed on the rotary table 8 as shown in FIG. 12, by which arrangement, the disadvantages in the conventional microwave ovens that the part of the food material or the like contained in the vessel 23 is split or scattered due to slipping of the vessel 23 due to the impact at the starting of the rotary table 8 or a sudden stopping of the rotation of the rotary table 8 in the worst case can be completely eliminated, while the flatness of the upper surface of the rotary table 8 is appreciably improved, without causing undesirable resiliency, and thus not only is the object to be heated stably mounted on the table 8, and deviations in the sizes of the gaps between the magnets can be minimized as described later.

Referring to FIGS. 8 and 9, the first rotary member 24 of the pulley configuration has, in its outer periphery, a pulley groove 41, while three rectangular recesses 42 each for receiving therein a permanent magnet 43 of a corresponding shape are provided in the ribs 24a of the member 24 on an imaginary circle concentric with said member 24, with one corner of each recess 42 having a shape different from the other corners for quick orientation of magnet polarities. After each of the permanent magnets 43 is inserted into the corresponding recess 42, a magnet cover 44 is applied over the magnet 43, with retaining pieces 44a extending downwardly from the four corners of the lower surface of the cover 44 being inserted into four corresponding openings 45 in the rib 4a adjacent to corners of the rectangular recess 42 and extending through the rib 24a into the lower surface of the rotary member 24, a resilient tongue 44b which is provided in each of the retaining pieces 44a engaging the lower surface of the rib 24a for positively holding the magnets 43 tightly in the recesses 42.

Adjacent to each of the recesses 42 for the magnets 43, there is formed in the corresponding rib 24a another recess 46 for receiving therein a roller 47 as shown in FIG. 9. The roller 47 is fixedly mounted on a roller shaft 48, and the recess 46 therefor is provided with grooves 49 for receiving the shaft 48, and accordingly, when the roller shaft 48 is inserted by a force F applied to the roller 47 into the grooves 49 of the recess 46 as shown in FIG. 11, the roller 47 is rotatably accommodated in the recess 46. Since the rollers 47 are adapted to rotate while contacting the lower surface of the bottom plate 2a of the heating cavity H, the covers 44 for the magnets 43 do not come into contact with the lower surface of the bottom plate 2a, and thus smooth rotation of the first rotary member 24 is achieved at all times.

Referring also to FIG. 12, in the making of the bottom plate 2a of the heating cavity H, the circular recess 9 is first formed at the central portion of the plate 2a, for example, by drawing, and there is subsequently formed a concentric annular second recessed portion 52 in the first recess 9 leaving an unrecessed portion beneath the rollers 22 and a central raised portion 53 approximately equal in dimension to a circular fixing plate 51 on a supporting shaft 50 of the first rotary member 24. The reason for providing the recess 52 is to eliminate the danger of uneven rotation of the first rotary member 24 due to contact between the recess 9 and the magnet covers 44 arising from undesirable resiliency at the drawn portion owing to strain developed by the processing or increase of strain due to temperature rise, and also to cause chips or the like of food material coming into the first recess 9 further to fall into the second recess 52. More specifically, since crumbs or chips of food material led to the inner side of the support frame 37 by the projection 40 on the frame 37 as shown in FIG. 7 are thus dropped into the second recess 52, such crumbs or chips are prevented from being accumulated under the rotational surfaces of the rollers 22 even if the microwave oven is disposed in an inclined manner, and thus smooth rotation both of the rotary member 24 and the rotary table 8 are achieved.

Since the supporting shaft 50 of the first rotary member 24 is first secured to the circular fixing plate 51 which is then connected to the under surface of the central raised portion 53 of the bottom plate 2a, for example, by spot welding, the shaft 50 is secured to the center of the recess 9, i.e., the center of the raised portion 53 in perfect alignment with the latter.

For assembling, the first rotary member 24 is inserted, through an opening 18a in the bottom plate 18 of the outer casing 1, onto the shaft 50 thus secured to the raised portion 53, and thereafter, a pin 54 is inserted into the shaft 50 in a position immediately below the hub of the rotary member 24 for supporting the latter. Subsequently, the bearing 32 for the shaft 28a of the second rotary member 25 is secured by screws to the bottom plate 18 of the outer casing 1 at a position a predetermined distance away from the shaft 50 of the first rotary member 24, with said distance being determined by a jig (not shown). After the belt 26 is passed around the first and second rotary members 24 and 25, a bottom cover plate 18b for the opening 18a is secured to the bottom plate 18, for example, with screws 18c.

Thereafter, when the rotary table 8 is mounted on the upper surface of the recess 9, the permanent magnets 35 of the rotary table 8 will be attracted by the permanent magnets 43 on the first rotary member 24, thus the rotary table 8 being ready for rotation.

It is to be noted here that, for reducing the rotational torque of the rotary table 8 as small a value as possible, frictional resistances between various parts must be kept as low as possible. Accordingly, the worm wheel shaft 28a, roller shafts 48 for the rollers 47, supporting shaft 50 for the first rotary member 24 and the like are made of metallic material, while the first and second rotary members 24 and 25, the bearing 32 for the wheel shaft 28a and rollers 47 are formed, for example, of polyacetal resin, polybutylene terephthalate resin or the like. Furthermore, since the rollers 22 must be of material sufficient to endure the weight of food material in addition to the frictional resistance and at the same time, the heat due to high frequency loss, said rollers 22 are preferably made, for example, of ethylene tetrafluoride.

Referring now to FIGS. 13 to 15, the torque necessary for causing the rotary table 8 to rotate will be described hereinbelow. It is to be noted that the description is limited to a case wherein the motor drives only the rotary table 8 for simplification of the explanation.

Firstly, as the weight of food material to be placed on the rotary table 8 increases, the torque required for rotating the table 8 also increases linearly as shown in the graph of FIG. 13 wherein the necessary torque (kg·cm) is taken on the ordinate and the weight of the object to be heated is on the abscissa. Hence, if the size of the heating cavity H is known, the maximum weight P kg of the object to be heated which can be accommodated in the cavity H can be determined. Then, the rotational torque Q kg·cm necessary for causing the object having the maximum weight P kg to rotate can be obtained experimentally, if conditions for designing the method of rotation for the rotary table 8 are determined.

Secondly, the transmitting torque between the magnets fluctuates depending on the gaps therebetween as shown in the graph of FIG. 14 in which the transmitting torque (kg·cm) is on the ordinate and the gap between the magnets (mm) is on the abscissa, and curve A is a curve showing the relation between the gaps and the maximum value of the transmitting torque, the curve B is a curve showing the relation between the gaps and the minimum value of the transmitting torque, and curve C is a curve showing the relation for an intermediate value of the torque. If deviations of the gaps taking place during manufacturing are shown by $G_2$ and those of the magnets are represented by M2, with the minimum value and maximum value of the transmitting torque therebetween being denoted by $\tau_{Tmax}$ (kg·cm) and $\tau_{Tmin}$ (kg·cm) respectively, it is first necessary to establish the relation $$Q < \tau_{Tmin}$$

in order to cause the object of maximum weight P kg to rotate. On the other hand, the torque T which will cause the rotary table 8 to rotate by the driving motor can be represented by the following equation:

$$T = \tau_M \times 1/X \times \eta$$

wherein X is the gear ratio of the transmission system between the table and the motor, $\tau_M$ is the starting torque of the motor, $\eta$ is the driving transmission efficiency from the motor to the magnetic coupling the value of T being the substantial starting torque of the motor for rotating the rotary table 8.

In the arrangement as described above, should rotation of the rotary table 8 be prevented in a case where the substantial starting torque of the motor is smaller than the transmitting torque $\tau_T$ between the magnets, the motor will not rotate, even if it tries to rotate, due to the strong coupling between the magnets 35 of the rotary table 8 and the magnets 43 of the first rotary member 24, and the rotor of the motor remains stationary. On the contrary, if the substantial starting torque T of the motor is larger than the transmitting torque $\tau_T$ between the magnets 35 and 43, slipping takes place between the magnets 35 and 43 and the rotor of the motor will rotate even when rotation of the rotary table 8 is blocked.

Referring to the graph of FIG. 15 showing the relation between the rotational speed which is the main characteristic of the motor and the motor shaft torque, the rotational speed is $n_1$ at the motor shaft torque $\tau_{M3}$ during steady rotation of the motor, and when the rotary table 8 is block, if the value $\tau_{T1}$ obtained by conversion of the transmitting torque between the magnets to the motor shaft torque is reduced to a level smaller than the starting torque $\tau_M$ of the motor, the motor starts rotating and continues to rotate at the rotational speed $n_2$. Accordingly, once the motor starts rotating, the difference between the rotational speed $n_1$ during the steady rotation and the rotational speed $n_2$ in the blocked stated is trivial. It is to be noted that in the belt drive described as employed in the above embodiment for rotating the rotary table 8, it must be taken into account that there is a possibility of slipping of the belt portion if the tension of the belt is not sufficient. Similarly, the torque transmission described as taking place between the magnets 35 and 43 in the above embodiment should, needless to say, be considered to take place between the magnetic poles if the magnetic coupling is to be effected.

The foregoing description may be represented by a generalized formula as follows.

$$\tau_T < \tau_M \times 1/X \times \eta$$

Even if $\tau_T$ is further increased so as to be higher than the maximum value $\tau_{Tmax}$ of the transmitting torque of the magnets, the motor will not be blocked with the following effect as compared with the conventional cases wherein the motor is completely blocked.

(i) The dangers of deterioration of coil insulation, burning, catching fire and the like due to an increase of current flowing through the motor coil when the motor is blocked are advantageously eliminated. In the conventional arrangements, if the drive transmitting system is a belt drive, slippage may also take place at the belt when the belt tension is insufficient, resulting in the danger of excessive wear of the belt and damage to the belt due to the frictional heat, which possibilities are also eliminated by the arrangement of the invention wherein disengagement takes place between the magnets. Similar drawbacks inherent in the gear reduction system which may give rise to the danger of damage to gear teeth are also overcome by the arrangement of the present invention.

(ii) The the conventional arrangements, if the motor for rotating the rotary table is also used for cooling the magnetron assembly, the cooling action for the magnetron assembly is ended if the fan provided on the rotor stops, resulting in damage to the magnetron assembly, which inconveniences can advantageously be eliminated by the arrangement of the present invention. Furthermore, electrical components such as transformers, diodes and the like commonly disposed in the vicinity of the suction inlet of the cooling fan may be subjected to a temperature rise when the cooling fan is stopped, resulting in deterioration of the insulating properties, which conventionally disadvantages encountered are also overcome by the arrangement of the present invention.

As is clear from the foregoing description, according to the arrangement of the present invention, the object or food material to be heated is sufficiently protected against spilling or scattering, and even if crumbs or chips of such food material should fall onto the bottom plate of the heating cavity, the rotary table is arranged so that it can hardly blocked. In the arrangement according to the present invention, should the rotary table be prevented from rotating or blocked in the worst case, slipping takes place within the magnetic coupling without any damage being done to the various parts, thus making it possible to safely employ the rollers. Furthermore, since the rollers need not be connected to the bottom plate of the heating cavity, not only is the rotational torque reduced approximately by half as compared with the case wherein such rollers are connected to the same bottom plate, but cleaning of the interior of the heating cavity can be effected very easily and in an efficient manner.

It is to be noted here that, in the foregoing embodiment, although the present invention is mainly described with reference to a microwave oven employing a belt drive system for rotating the rotary table, the arrangement of the present invention is not limited, in its application, to a microwave oven having a belt drive system, but may readily be applicable to microwave ovens having other rotary table driving systems, for example, a gear driving system or the like.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. A microwave oven which comprises;
   (a) an oven defining structure,
   (b) a heating cavity defined by walls within said oven defining structure,
   (c) door means adapted to selectively open and close an access opening defined at one side of said heating cavity,
   (d) means for supplying microwave energy into said heating cavity,
   (e) rotary table means rotatably disposed on the upper surface of a bottom wall of said heating cavity for holding an object to be heated thereon and adapted to rotate about a rotational axis,
   (f) a rotary member rotatably disposed adjacent to a lower surface of the bottom wall of said heating cavity and said rotary table means,
   (g) means for magnetically coupling said rotary table means with said rotary member,
   (h) a driving motor and reduction gear means associated with said rotary member for driving said rotary member, said driving motor has a starting torque $\tau_M$ according to the formula:

$$\tau_T < \tau_M \times 1/X \times \eta$$

where $\tau_T$ is the transmitting torque of said magnetic coupling means, $\eta$ is the driving transmitting efficiency from said driving motor to said magnetic coupling means, and X is the gear ratio of said reduction gear means, whereby when the rotary table means is blocked against rotation, said driving motor will run.

2. A microwave oven as claimed in claim 1, wherein said rotary table means has a circular disc-like configuration, is made of a non-magnetic metallic material, and has an annular raised portion on its upper surface adjacent to an outer periphery of said rotary table means, said annular raised portion defining an annular concave groove on the lower surface of said rotary table means, rotatable roller means of synthetic resin rotatably mounted on said rotary table means and projecting into said groove, the portion of said upper surface rising to said annular raised portion serving as means for positioning a bottom support rim of a vessel for holding the object to be heated in said oven when said vessel is placed on said rotary table means.

3. A microwave oven as claimed in claim 1, wherein said rotary table means comprises at least three rotatable rollers rotatably supporting said rotary table means on the upper surface of the bottom wall of said heating cavity, and said rotary table means has an outwardly extending projection thereon in front of each of said rotatable rollers in the direction of advance of said rotatable rollers for removing foreign matter present in the path of said rollers.

4. A microwave oven as claimed in claim 3, wherein said projection is inclined forwardly with respect to the direction of advance of said rotatable rollers.

5. A microwave oven as claimed in claim 3, wherein the bottom plate of said heating cavity has an annular recess therein for accumulating the foreign matters removed by said projections.

6. A microwave oven as claimed in claim 1, wherein said bottom wall of said heating cavity has a circular recess therein for accommodating therein said rotary table means, and further comprising a support shaft on the lower surface of the bottom wall of said heating cavity in a position corresponding to the center of said circular recess, said rotary member being rotatably mounted on said support shaft.

7. A microwave oven as claimed in claim 1, wherein said reduction gear means for said driving motor comprises worm gear means constituting a first stage and belt means constituting a second stage.

8. A microwave oven which comprises;
  (a) an oven defining structure,
  (b) a heating cavity defined by walls within said oven defining structure,
  (c) door means adapted to selectively open and close an access opening defined at one side of said heating cavity,
  (d) a rotary table detachably, rotatably disposed on the upper surface of a bottom wall of said heating cavity,
  (e) a first rotary member rotatably mounted on the lower surface of the bottom wall of said heating cavity,
  (f) a second rotary member and a belt connecting said first and second rotary members for simultaneous rotation,
  (g) means for magnetically coupling said rotary table with said first rotary member,
  (h) a high frequency oscillator for supplying microwave energy into said heating cavity,
  (i) a fan motor for cooling said high frequency oscillator,
  (j) a worm gear driven by said fan motor, and
  (k) a transmission rod on which said worm gear and second rotary member are mounted for transmitting rotation of said worm gear to said second rotary member.

9. A microwave oven as claimed in claim 8, further comprising a case of synthetic resin for holding said worm gear in position, said case having upper and lower portions, said upper portion having a bearing thereon for one end of the wheel shaft of said worm gear, and said lower portion having a hole therein through which said wheel shaft extends to said second rotary member.

* * * * *